United States Patent [19]
Ray

[11] Patent Number: 6,167,388
[45] Date of Patent: Dec. 26, 2000

[54] SYSTEM AND METHOD FOR THE SELECTION OF HEATING EQUIPMENT

[75] Inventor: Charles E. Ray, Carmel, Ind.

[73] Assignee: C. E. Ray Company, Inc., Carmal, Ind.

[21] Appl. No.: 08/965,101

[22] Filed: Nov. 6, 1997

[51] Int. Cl.[7] .................................................. G06F 17/60
[52] U.S. Cl. ........................... 705/400; 700/90; 705/29
[58] Field of Search .............................. 364/400; 705/29, 705/400; 700/90

[56] References Cited

U.S. PATENT DOCUMENTS

| | | | |
|---|---|---|---|
| 4,065,661 | 12/1977 | Jaskowsky | 705/400 |
| 4,473,307 | 9/1984 | Dobronyi et al. | 374/39 |
| 4,782,448 | 11/1988 | Milstein | 705/400 |
| 4,885,694 | 12/1989 | Pray et al. | 705/400 |
| 4,887,206 | 12/1989 | Natarajan | 705/29 |
| 5,063,506 | 11/1991 | Brockwell et al. | 705/7 |
| 5,111,392 | 5/1992 | Malin | 705/29 |
| 5,189,606 | 2/1993 | Burns et al. | 705/10 |
| 5,249,120 | 9/1993 | Foley | 705/1 |
| 5,515,269 | 5/1996 | Willis et al. | 705/29 |
| 5,579,231 | 11/1996 | Sudou et al. | 364/468.01 |
| 5,655,087 | 8/1997 | Hino et al. | 705/29 |
| 5,767,848 | 6/1998 | Matsuzaki et al. | 345/331 |
| 5,893,082 | 4/1999 | McCormick | 705/400 |
| 5,920,849 | 7/1999 | Broughton et al. | 705/400 |

*Primary Examiner*—Edward R. Cosimano
*Attorney, Agent, or Firm*—Woodard, Emhardt, Naughton, Moriarty & McNett

[57] ABSTRACT

The present invention relates to an automated system for specifying radiant tube heating systems. The automated specification system calculates the heat loss for a structure and adjusts the heat loss value according to deviations from standard radiant heating system installations. The specification system provides the user with burner and tube layout parameters in conjunction with an input menu for receiving the accessory equipment inputs of the radiant tube heating system. The specification system retrieves equipment specifications from a product database in response to user inputs and presents the user with a complete specification package for the specified radiant tube heating system.

20 Claims, 7 Drawing Sheets

| | |
|---|---|
| 310 — | Temperature Information<br>Outside Temp. [0] F    Inside Temp. [65 ▽] F    Temp. Difference [65] F |
| 320 — | Degree Day Information<br>Select nearest city    [Alabama / Birmingham / Huntsville / Mobile / Montgomery / Alaska / Alabama ▽] |
| 330 — | Fuel Information<br>Select Fuel Type    ⊙ Natural Gas    ○ L.P.<br>Enter Fuel Cost    $ [0.55] $<br>(Nat. Gas - $ per Therm)<br>(L.P. - $ per Gallon) |
| 340 — | Insulation<br>How well is the building insulated?    [Average ▽] |
| 350 — | Exposed Walls<br>Total Exposed Lineal Feet    [0] Ft.<br>Wall Height    [0] Ft.<br>U Factor of Exposed Walls    [0.15] |
| 360 — | Exterior Windows<br>Total Area of Windows    [0] Sq. Ft.<br>U Factor of Exterior Windows    [1.22] |
| 370 — | Exterior Doors<br>Total Area of Doors    [0] Sq. Ft.<br>U Factor of Exterior Doors    [0.65] |
| 380 — | Roof<br>Total Area of the Roof    [0] Sq. Ft.<br>U Factor of Roof    [0.26] |
| 390 — | Floor<br>Total Lineal Feet of the Floor    [0] Ft.<br>U Factor of Floor    [0.81] |
| 400 — | Gravity Infiltration<br>How many air changes occur in an hour?    [Medium ▽]    [1.0] AC/hour<br>Mechanical Exhaust<br>Mechanical Exhaust (heating season)    [0.0] CFM |

Fig. 3

| | BTU Capacity | Fan Motor | Number of Burners | Miscellaneous |
|---|---|---|---|---|
| ⬛ | 75,000 | 1/6 H.P. | 1 | ** See information below |
| ⬛ | 75,000 | 1/4 H.P. | 2 | ** See information below |
| ⬛ | 75,000 | 1/2 H.P. | 3 | ** See information below |
| ⬛ | 75,000 | 1/2 H.P. | 4 | ** See information below |
| ⬛ | 105,000 | 1/6 H.P. | 1 | ** See information below |
| ⬛ | 105,000 | 1/4 H.P. | 2 | ** See information below |
| ⬛ | 105,000 | 1/2 H.P. | 3 | ** See information below |
| ⬛ | 105,000 | 1/2 H.P. | 4 | ** See information below |
| ⬛ | 130,000 | 1/6 H.P. | 1 | ** See information below |
| ⬛ | 130,000 | 1/4 H.P. | 2 | ** See information below |
| ⬛ | 130,000 | 1/2 H.P. | 3 | ** See information below |
| ⬛ | 130,000 | 1/2 H.P. | 4 | ** See information below |

Fig. 4

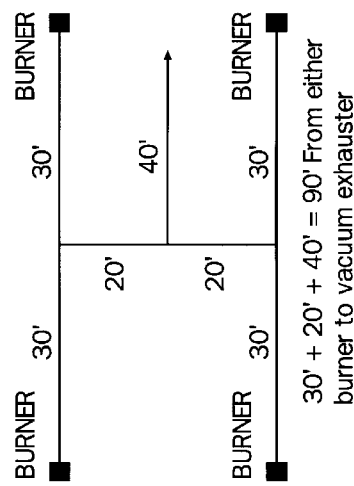
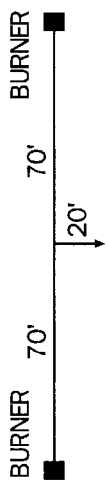
Fig. 5

| Select burner type: | ⦿ Natural Gas<br>○ Propane | |
|---|---|---|
| Enter Total Length<br>of Radiant Tube Needed: | [0] Ft. (Total Feet of Radiant Tube Required)<br>**Note: Number of 10' Extensions will be updated automatically. | |
| | [0] Number of 90-degree elbows | |
| | [0] Number of 45-degree elbows | |
| | [0] Number of Standard Tees | |
| | [0] Number of Tees w/ dampers in line | |
| | [0] Number of Tees w/ dampers at 90 deg. | |
| | [0] 4" Fresh Air Inlet Assemblies | |
| | [0] 6" Fresh Air Inlet Assemblies | |
| | [0] 4" Diameter Roof or Wall Vents | |
| | [0] 6" Diameter Roof or Wall Vents | |
| | [0] Moisture Proof Thermostats | |
| | [0] Boxes of "S" Hooks | |
| | [0] Number of 10 ft. Side Shields | |
| | [0] 100' Length of Hanging Chain | |
| | [0] Number of 10 ft. Extensions | |
| | Create Equipment Report | |

Fig. 6

SYSTEM AND METHOD FOR THE SELECTION OF HEATING EQUIPMENT

BACKGROUND OF THE INVENTION

The present invention is related to an automated system and method for the selection and retrieval of product information stored in an electronic medium. The invention is particularly useful for the selection of radiant tube heating equipment.

In modern times, it has become routine to provide an entire structure or a space within a structure with equipment to control the interior air temperature. This occurs both in new structures and when retrofitting or renovating existing structures. There are a wide range of products available for supplying the heating requirements of a space or structure. Selection of the appropriate product or products depends on a number of factors including: available energy sources, cost of energy sources, amount of heating required, physical layout and size of the spaces to be heated, size of the equipment, cost of the equipment, etc. When retrofitting existing structures, the delivery mechanism for the heat plays a significant factor. Specifically, routing a ducted forced air system where none previously existed may require extensive remodeling, while installing radiant type heaters might require only minimal structural modification.

Thus, considerable forethought and planning may go into the selection and purchase of air temperature control equipment. A significant factor in the selection of heating products is the determination of how much heating is required for a particular structure or space. An estimate of the heating requirements for a structure can be determined by calculating the amount of heat that is lost from the building to the surrounding environment.

Such calculations are well known and offer different levels of accuracy depending on the information input. A variety of packaged computer programs are available to perform the calculation of a heat loss value based on user inputs. A typical calculation takes into account, the temperature differential between the interior air and the typical outside air during the heating season, the type of building material used in the structure, the number and size of openings (doors, windows, skylights, etc.), the size and type of roof and floor, the amount of insulation, etc. All, or a portion, of this information is then utilized in known formulas to determine an estimate for the amount of heat that is lost to the outside by conduction through the materials.

A determination of the heat loss value may also include the approximate amount of outside air that enters the structure or space during a given time period. This often takes the form of how quickly the air within the structure is exchanged for outside air. Based on this determination, the amount of heat lost by air infiltration may also be taken into account. The combination of the heat lost through conduction and the heat lost by air infiltration provides a reasonable estimate for the heating requirement of the space or structure. This estimate may be then used as a basis for the selection of heating equipment.

After determining the heat loss value for a structure or space, a designer or customer must then find a product or products to satisfy the estimated heating requirements. This process involves reviewing product information either in paper catalogs or more recently, electronic catalogs, to identify equipment that may satisfy the heating requirements. This selection process is particularly cumbersome and time consuming for the selection and specification of radiant tube heating systems where the heat output is dependent both on burner output and tube length. Moreover, tube lengths and configurations must correspond to the dimensions of the space to be heated and to burner and radiant tube layout parameters necessary for safe and efficient operation. Thus, while knowing the heat loss value of structure is a starting point for equipment selection, with respect to radiant tube heating systems, much more detailed information must be generated before a complete system may be assembled.

Thus, there is a need for a convenient system and method of selection for radiant tube heating systems that prompts the user for the appropriate inputs to determine the heat loss value of the structure and then presents the user with available products and configuration parameters to satisfy the heating requirements of a particular structure.

SUMMARY OF THE INVENTION

The present invention relates to a method for retrieving product information, comprising storing radiant tube burner layout parameters in a machine readable medium storing product information for a plurality of radiant tube heating products including burners and accessory equipment in a machine readable medium; presenting to a user at least one input option for determination of a heat loss value of a structure; determining the heat loss value of a structure based on the user inputs; prompting the user for radiant tube heater installation information; adjusting the heat loss value if radiant tube heater installation deviates from a standard installation; displaying a plurality of radiant tube burners with accompanying heat outputs; prompting the user to select at least one burner; displaying burner and radiant tube system layout parameters; displaying radiant tube heating accessory equipment; prompting the user to select accessory equipment; and retrieving product information from the database of the selected at least one burner and accessory equipment.

An object of the present invention is to provide a convenient method for the selection of radiant tube heating equipment.

Another object of the present invention is to provide an apparatus for the convenient selection of radiant tube heating equipment.

Yet another object of the invention is to provide a computerized selection process that prompts the user to input installation information impacting heat output of a radiant tube heating system.

Still a further object of the present invention is to provide the user with burner and tube layout parameters in conjunction with a list of burner and accessory equipment necessary to create a desired radiant heating system satisfying layout parameters.

Other objects and advantages of the present invention will be apparent to those skilled in the art from a reading of the following description of an embodiment of the invention.

BRIEF DESCRIPTION OF THE DRAWINGS

FIG. 3 is an example of a screen display according to the present invention prompting the user for inputs to determine a heat loss value.

FIG. 4 is an example of a screen display according to the present invention showing available products and prompting the user for product selection.

FIG. 5 is an example of a screen display according to the present invention showing burner and radiant tube heater layout and parameters.

FIG. 6 is an example of a screen display according to the present invention prompting user selection of available accessory equipment options.

DESCRIPTION OF THE PREFERRED EMBODIMENT

Figure 1:
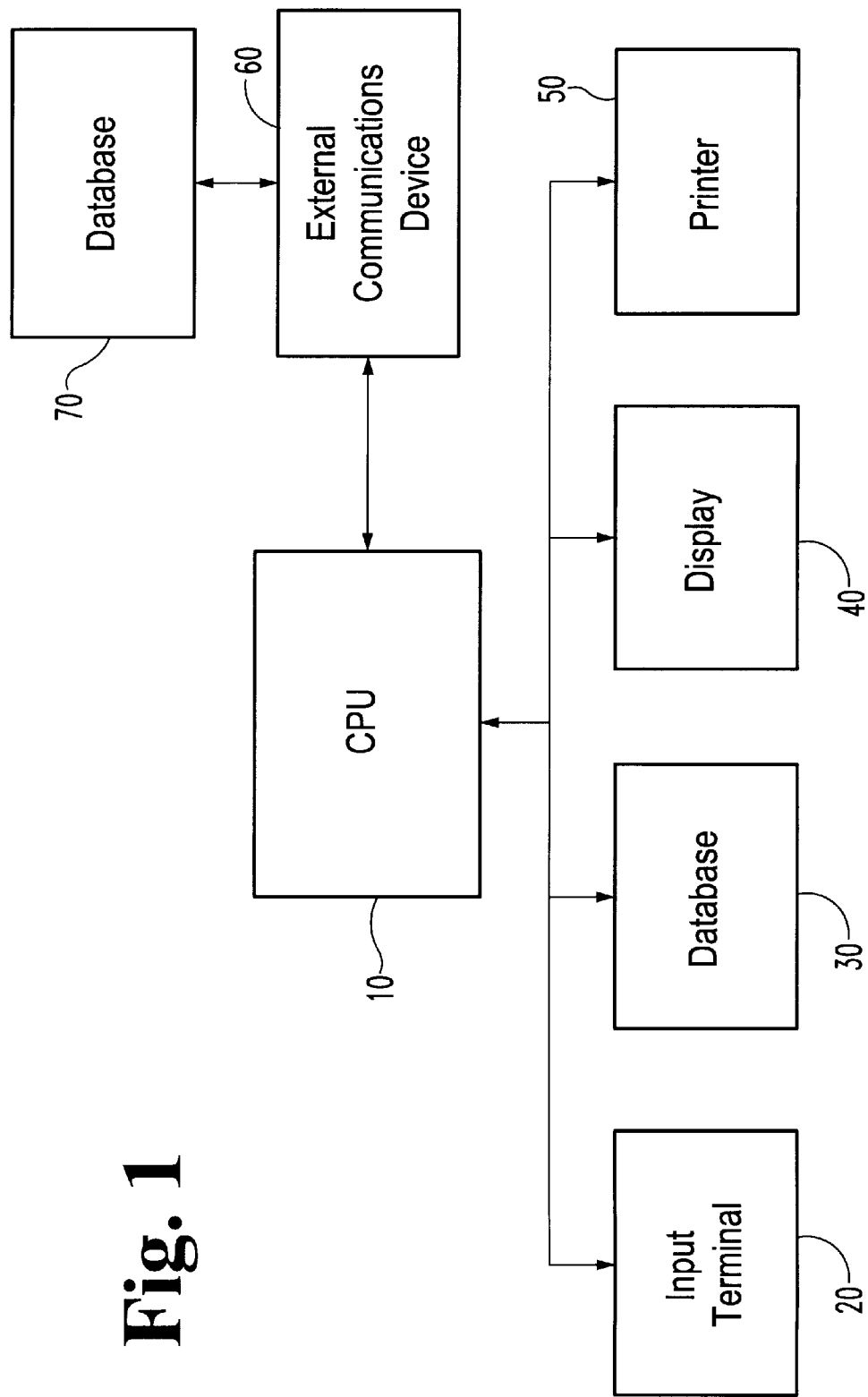
FIG. 1 is a block diagram of the hardware components according to the present invention.

For the purposes of promoting an understanding of the principles of the invention, reference will now be made to the embodiment illustrated in the drawings and specific language will be used to describe the same. It Will nevertheless be understood that no limitation of the scope of the invention is thereby intended, such alterations and further modifications in the Illustrated device, and such further applications of the principles of the invention as illustrated therein being contemplated as would normally occur to one skilled in the art to which the invention relates.

FIG. 1 shows the basic arrangement of a system according to the present invention. It will be understood that the components shown in FIG. 1 are commonly referred to in a collective manner as a computer. The core of the computer system is central processing unit ("CPU") 10. CPU 10 is coneced to database 30. Database 30 can be stored in the memory of the computer, or on a machine readable medium, such as a diskette or compact disc. In the case of the database being in a remote location, CPU 10 may access remote database 70 through external communications device 60. It is contemplated that if database 30 is in a writable storage medium, then CPU 10 may contact remote database 70 to update resident database 30. The database contains information about various products and/or services, and the vendors who sell them. In a preferred embodiment, the database may be the equivalent of thousands of catalog pages, engineering specifications, system configurations, installation instructions, warranty information, prices, product images, estimated installation times, etc.

CPU 10 also communicates with input terminal 20 to receive user inputs. Input terminal 20 may be a keyboard, mouse, touch screen, touch pad, etc., or any combination thereof. CPU 10 is further connected to a display 40 for displaying information to the user. In a preferred embodiment, CPU 10 prompts the user through display images for necessary information. Display 40 also displays the results of input selections for user verification. CPU 10 may also be connected to printer 50, either directly or through a network connection, to permit the user to selectively generate hard copies of product selections and specifications.

In a preferred embodiment, the program and accompanying databases are stored on a read only device, such as a compact disk. The disk is loaded into the computer and the computer reads the database or databases residing on the compact disk.

It is contemplated that CPU 10 may be connected directly to a vendor's computer (not shown) through external communications device 60. Such a connection may be for the limited purpose of downloading a product selection to the vendor computer to accomplish product ordering. Alternatively, the vendor's computer may house the product specification database 70 such that the process of inputs and product selection will be conducted, at least in part, through the vendor's computer. Thus, through external communications device 60. the user may access the vendor's selection program and database 70 to determine the type of product required and ultimately, select a product from those offered by the vendor. In this mode, the user need only have external communications access, a display and an input terminal to operate the selection program stored in the vendor's computer.

Figure 2A:
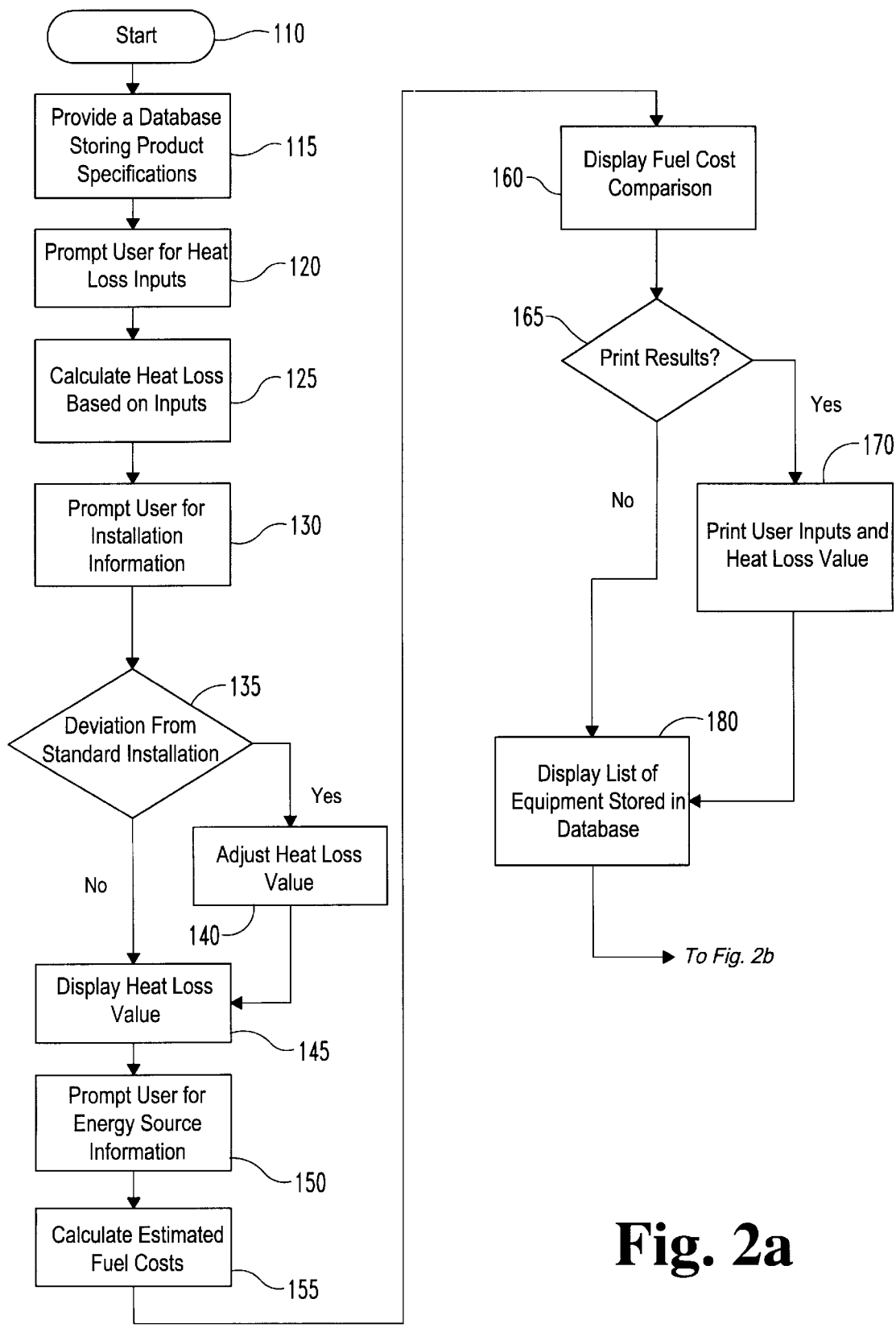
FIGS. 2a and 2b are a flowchart diagram for an exemplary equipment selection routine according to the present invention.
Figure 2B:
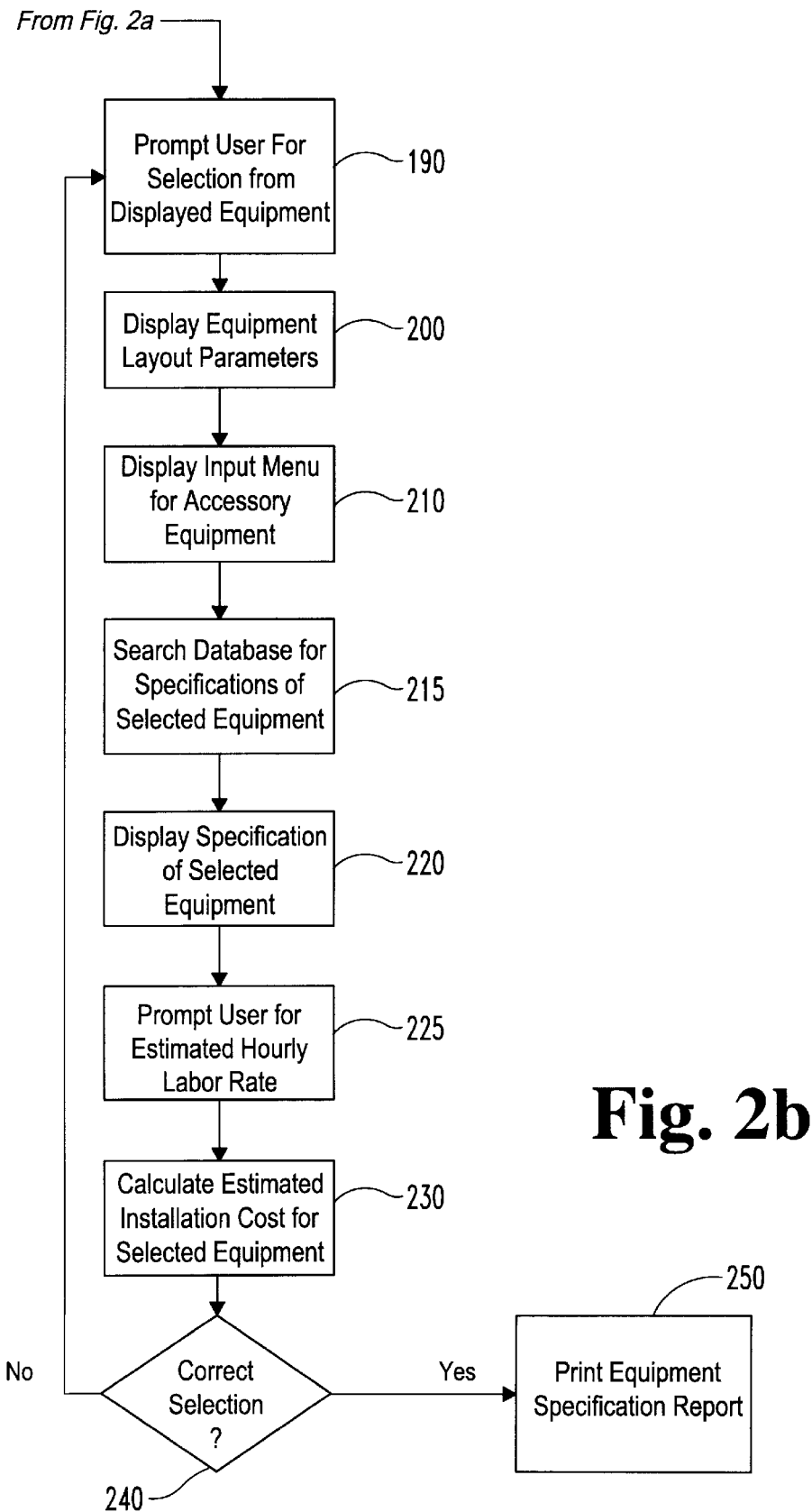

FIGS. 2a and 2b are a flow chart illustrating a possible means of performing the method of the present invention. In a preferred embodiment, the computer housing the program is initialized in start step 110. It the method is being conducted on an isolated machine this involves loading the appropriate files into the computer memory. If the program has previously been loaded, the program may be started by selecting the appropriate program from a menu, or otherwise instructing the computer to begin the program. If the method is being conducted from a remote location, the user must first make contact with the host computer through an external commnunications device. Once contact is established the method is performed in essentially the same manner.

After the program is initialized, at step 115, a database may be provided by inserting the appropriate disk into the machine. Alternatively, the program may find or be instructed to find, the correct path to the appropriate database already available to the machine. In a preferred embodiment, the database contains a variety of product information regarding radiant tube heaters. Without limitation, such information may include product types, BTU ratings, engineering specifications, burner and tube layout parameters, accessory equipment, installation instructions, warranty information and equipment prices. It is contemplated that the database may be programmed with more or less information and still come within the spirit of the invention.

At step 120, the user is promoted to enter information about the structure or space that requires heating equipment to maintain a relatively constant temperature. As explained further below, the user is prompted for a variety of inputs at step 120. Referring now to FIG. 3, there is illustrated an example of a user input menu for providing information relating to the heat loss value of a structure. In many of the blocks, the program provides a default value that is an average value in the event the user does not know the specific information. In addition, in a preferred embodiment of the present invention, there is a "U" value look up table for a variety of materials.

Block 310 requests that the user indicate the approximate average outside winter temperatures and the intended inside temperature. This Generates the average temperature differential between the exterior and the interior spaces. If the user does not know this information, the program also lists, in block 320, a number of large cities from which the user may select the closest city. The average temperature of the selected city may be used for further calculations.

In block 330 the program prompts the user to enter the energy source and approximate fuel cost per unit. This information is used to compare various types of heating products that may be used to satisfy the heat loss requirements of the structure. It is particularly useful in selecting heating equipment since there are a number of heating energy sources and distinct varieties of heating equipment. Specifically, in addition to consideration of fuel source (i.e. electricity, natural gas, fuel oil, liquid propane, etch) there are a number of options for delivering the heat (i.e. forced air, radiant tube heaters, boiler systems, etc.). Based on the fuel type and cost information, the program may provide the user with a valuable comparison in annual costs between various fuels and heating equipment types.

Block 340 prompted the user to input how well the building is insulated. Block 350 seeks the total lineal feet and height of the exterior walls and their "U" value. The "U" value of a variety of materials is preferably listed in a database look-up table assessable while completing the input menu of FIG. 3. Blocks 360 and 370 request information about the total area of exterior windows and doors, respectively. Blocks 380 and 390 request information about the size of the roof and floor, respectively. The information received in blocks 310, 320, 340 through 390 is utilized to determine the transmission heat loss of the building.

A further element of the heat loss value for a structure is the amount of outside air entering the building. Block 400 requests information about mechanical exhausts in the structure and an estimate of gravity infiltration into the structure. Based on this information the infiltration heat loss may be calculated. The sum of the transmission heat loss and infiltration heat loss provides a reasonable estimate of the total heat loss value for the structure.

Referring to FIG. 2a, based on these user inputs, the program calculates the heat loss value in BTU's (British Thermal Units), step 125, of the space or structure to be heated. Although BTU's are the industry standard for heating units, other units could be utilized without deviating from the spirit of this invention. This calculation is well known in the heating industry and generally determines an estimated heat loss value for a space or structure. This value represents an approximation of the amount of heat leaving the space or structure during a given period of time and is useful in estimating the output of heating equipment necessary to maintain the temperature inside the space or structure.

In a preferred embodiment directed to radiant tube heaters, the user is prompted at step 130 to enter general information about the anticipated installation of the heating equipment. This information is particularly important for radiant tube heating systems, as there are several variables that can have a significant impact on the effective heat output of the system.

Specifically, the user may be prompted to determine if outside air will be used for combustion in the heater burner. If so, the heat loss value should be adjusted, step 140, typically by ten percent to account for the additional heating capacity required. Similarly, for radiant tube heaters, the mounting height above the floor impacts effective heat output. Thus, in a preferred embodiment, for every foot over 15 feet, the heat loss value is increased by one percent at step 140.

In addition to these two variables, the type of floor under the radiant tube heating system has a significant impact on the effective heat output of the system. As will be understood by those skilled in the art, the system radiates heat toward the floor. Ideally, the floor and items in the space absorb the radiant energy and then release heat to the room. Thus, the more radiant energy that can be absorbed by the floor, the more efficient the radiant heating system. The standard heat output rating for radiant systems is based on a concrete floor, a relatively good absorber of radiant energy. Thus, for example, wood and dirt floors are typically more reflective of radiant energy than concrete and require approximately double the radiant heating capacity to heat the same size space. The preferred embodiment of the present invention prompts the user for this type of information at step 135. Once the variables impacting the effective heat output of a radiant tube heating system have been input, the system revises the heat loss value in step 140, if necessary. If there are not adjustments to the heat loss value, the program proceeds to step 145, as shown in FIG. 2a. It will be understood that although the present system adjusts the heat loss value the same effect could be achieved by adjusting the effective heat output of each burner listed in the database.

Once the program has calculated the effective heat loss value for the structure, the value is displayed for the user, step 145. The user will have the heat loss value available for later reference in product selection.

In a preferred embodiment of the invention and as previously described, the user is also prompted (FIG. 3, block 330) to provide information regarding the energy source intended to be utilized along with the cost of the source. This information can be input when the heat loss information is input or in step 150. With this information, at step 155, the program may determine an estimated annual energy cost for various types of heating options satisfying the heat loss value previously calculated. The fuel consumption and cost comparison is then displayed at step 160. This information provides the user with further information for making a product selection.

After these calculation have been completed, the user is prompted to print the heat loss value, user inputs and results, step 165. It is contemplated that most users will opt for printing the results and user inputs in step 170 to permit the input information to be verified for accuracy and maintained for later reference. If the user elects not to print the heat loss value, the program proceeds to step 180, as shown in FIG. 2a.

In step 180, the program displays a list of equipment options by general product line for the user's consideration. Preferably, these include both different types of straight and U-shaped radiant tube systems. Initially, the user may select a product line. Once a product line is selected, the products in that product line are displayed for the user. An exemplary screen display according to the present invention is shown in FIG. 4. The products are shown with their BTU output ratings listed along with the exhaust fan motors required as a result of the number of burners needed for a given application. At step 190, the user is prompted to select an individual product or series of products from those listed, to meet or exceed the total heat loss value.

In a preferred embodiment, step 200 provides a screen display similar to the example shown in FIG. 5. This information is stored in a database associated with the program. The exemplary screen display shown in FIG. 5 provides the user with tube and burner layout parameters and a graphic image of typical burner layouts and radiant tube lengths to assist the user in equipment selection. This information is very helpful in the proper selection of a radiant tube heating system. Specifically, radiant systems rely at least in part on the radiant energy reaching the people in the room, the floor and the items in the room. Therefore, radiant tubes must be in relatively close proximity to the area or things to be heated. One limitation of the system layout is that for different burner outputs, the tubes have different minimum and maximum tube lengths before reaching the vacuum exhausters that permit safe and efficient operation of the system. The selection of tubes is further complicated by the fact that specifications limit the placement of elbows, tees, and dampers to specific locations in the system. Therefore, the display of FIG. 5 includes a graphic display of the typical layouts and a table of tube lengths and burner locations for adapting variations of the typical configurations.

Still further, in a preferred embodiment, once the user selects a specific burner or combination of burners to satisfy the heat loss value, in step 210, a display according to FIG. 6 is displayed for user input of accessory equipment. By way of example and without limitation, accessory equipment includes: radiant tubing, elbows, tees, dampers, fresh air inlet assemblies, thermostats, exhaust vents, reflective shields chains and hooks. It will be understood that accessory items can be selected to create the specifications for a radiant heating system to meet a desired application. Preferably, the screen display is split to show both the display of FIG. 5 and FIG. 6 concurrently to facilitate quick and convenient user selection of the proper type and amount of accessory equipment. However, it is contemplated that the screen displays of FIG. 5 and FIG. 6 could be accessed individually, although simultaneous display is particularly convenient for the user.

Upon completion of user input for accessory equipment, the user may select the "create equipment report" block in FIG. 6. This selection commands the program to search the database for the complete specifications and product information of the selected burners and accessory equipment, step 215. This information is displayed to the user at step 220. Freferably, the information display includes a complete listing of the products selected, images of the products, prices, detailed performance data and warranty information. In addition to simply retrieving the product information, the program also provides a total of the cost of equipment necessary to build the system specified by the user.

The above described selection program provides an accurate and convenient method for the specification and selection of radiant tube heating equipment. Moreover, the selection program eliminates the need for the user to review or scroll through catalog specification for unwanted products. The report creates a complete listing of only the selected products necessary to build the desired radiant heating system.

Although the present invention focuses primarily on the selection of heating equipment, it is further contemplated that the database mast include estimated installation times for each product. The program may prompt the user for an estimate of local labor cost, step 225. Thus, at step 230, the program may calculate the estimated installation cost for the system which the user has specified with this feature, the system updates the equipment report to include not only a complete list of necessary equipment for a specific structure and the price of the equipment, but also an estimate of the cost of installation. Thus, the system may produce a complete specification package for an entire radiant heating system.

If the displayed equipment report is correct, step 240, a report is printed in step 250. If the report is not correct, the user may restart the selection process by returning to step 190.

The program may also include retrieval of installation instructions for each product. Thus, if desired, the user may generate the heating or cooling equipment specifications, costs, and installation instructions in a single document or file.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for retrieving product information, comprising:

storing radiant tube burner layout parameters in a machine readable medium;

storing product information for a plurality of radiant tube heating products including burners and accessory equipment in a machine readable medium;

displaying a plurality of radiant tube burners with accompanying heat outputs;

prompting the user to select at least one burner;

displaying burner and radiant tube system layout parameters;

displaying radiant tube heating accessory equipment;

prompting the user to select accessory equipment; and retrieving product information from the database of the selected at least one burner and accessory equipment.

2. The method of claim 1, further including selecting the burner fuel source.

3. The method of claim 1, wherein displaying parameters includes displaying a graphic image of burner and tube layouts.

4. The method of claim 1, further including presenting to a user at least one input option for determination of a heat loss value of a structure and caculating the heat loss value of the structure based on the user input.

5. The method of claim 4, further including prompting the user for inputs to determine average energy costs and calculating an average energy cost to satisfy the heat loss value with alternative heating equipment.

6. The method of claim 4, further including prompting the user for equipment installation information and adjusting the heat loss value if installation deviates from standard installation.

7. The method of claim 6, wherein the installation information includes the height of the radiant tube heaters from the floor.

8. The method of claim 6, wherein the installation information includes the type of combustion air utilized for the burners.

9. The method of claim 6, wherein the installation information includes the type of floor beneath the radiant tube heaters.

10. A method for the selection of radiant tube heaters, comprising:

storing information regarding a plurality of radiant tube heater products in a database;

presenting to a user at least one input option for determination of an estimated heat loss value of a structure;

determining the estimated heat loss value of the structure based on the user inputs;

prompting the user for radiant tube heater installation information;

adjusting the heat loss value if radiant tube heater installation deviates from a standard installation;

presenting a user with a list of at least a portion of the stored product information;

prompting the user to select at least one of the displayed products; and retrieving the selected product information from the database.

11. The method of claim 10, wherein the installation information includes the height of the radiant tube heaters from the floor.

12. The method of claim 10, wherein the installation information includes the type of combustion air utilized for the burners.

13. The method of claim 10, further including prompting the user for inputs to determine average energy costs and calculating an average energy cost to satisfy the heat loss value with alternative heating equipment.

14. The method of claim 10, further including printing out the product information of the selected unit and accessories.

15. The method of claim 10, wherein the installation information includes the type of floor beneath the radiant tube heaters.

16. The method of claim 15, wherein said radiant tube heaters include straight and U-shaped emitter tubes and further including the step of presenting the user with an option to select either straight or U-shaped emitter tubes.

17. The method of claim 10, further including storing radiant tube burner layout parameters and accessory equipment information in a machine readable medium, displaying burner and radiant tube system layout parameters, displaying radiant tube heating accessory equipment, prompting the user to select accessory equipment and retrieving product information from the database of the selected accessory equipment.

18. The method of claim 17, wherein the product information includes the estimated installation time and further includes prompting the user for local labor rates and calculating the estimated installation cost for the selected equipment.

19. A method for retrieving product information, comprising:

storing radiant tube burner layout parameters in a machine readable medium;

storing product information for a plurality of radiant tube heating products including burners and accessory equipment in a machine readable medium;

presenting to a user at least one input option for determination of an estimated heat loss value of a structure;

determining the estimated heat loss value of the structure based on the user inputs;

prompting the user for radiant tube heater installation information;

adjusting the heat loss value if radiant tube heater installation deviates from a standard installation;

displaying a plurality of radiant tube burners with accompanying heat outputs;

prompting the user to select at least one burner;

displaying burner and radiant tube system layout parameters;

displaying radiant tube heating accessory equipment;

prompting the user to select accessory equipment; and retrieving product information from the database of the selected at least one burner and accessory equipment.

20. The method of claim 19, further including prompting the user for cost per unit energy and calculating the average cost for meeting the heat loss value for at least two different types of heating systems.

* * * * *

UNITED STATES PATENT AND TRADEMARK OFFICE
CERTIFICATE OF CORRECTION

PATENT NO.    : 6,167,388
DATED         : December 26, 2000
INVENTOR(S)   : Ray

It is certified that error appears in the above-identified patent and that said Letters Patent is hereby corrected as shown below:

Title page,
Item [56], References Cited, U.S. PATENT DOCUMENTS, add the following:
-- 4,964,043   10/1990   Galvin ................... 364/401
   4,972,318   11/1990   Brown et al. ............ 364/403
   4,992,940    2/1991   Dworkin ................ 364/401
   5,109,337    4/1992   Ferriter et al. ........... 705/29
   5,440,479    8/1995   Hutton .................. 364/401
   5,528,490    6/1996   Hill ...................... 364/403
   5,550,746    8/1996   Jacobs ................. 364/479.01
OTHER PUBLICATIONS SPACE RAY Infrared Gas Heaters for Industry, Heating Technology for the 1990's, Thomas Publishing Company, 1997.

The Trane Company, Creating the Right Atmosphere, Load Express.

Carrier "Comfort at Work", Software: HVAC Engineering Design. --

Column 3,
Line 14, please change "Will" to -- will --.
Line 17, please change "Illustrated" to -- illustrated --.
Line 26, please change "coneced" to -- connected --.

Column 4,
Line 9, please change "It" to -- If --.
Line 34, please change "promoted" to -- prompted --.
Line 48, please change "Generates" to -- generates --.
Line 62, please change "etch" to -- etc. --.

Column 5,
Line 1, please change "prompted" to -- prompts --.

UNITED STATES PATENT AND TRADEMARK OFFICE
CERTIFICATE OF CORRECTION

PATENT NO. : 6,167,388
DATED : December 26, 2000
INVENTOR(S) : Ray

It is certified that error appears in the above-identified patent and that said Letters Patent is hereby corrected as shown below:

Column 7,
Line 40, please change "mast" to -- may --.
Line 44, please insert a period after "specified", and change "with" to -- With --.

Column 8,
Line 28, please change "caculating" to -- calculating --.

Signed and Sealed this

Seventeenth Day of May, 2005

JON W. DUDAS
*Director of the United States Patent and Trademark Office*